No. 729,704. PATENTED JUNE 2, 1903.
A. D. VAN AUSDALL.
WHEEL TIRE.
APPLICATION FILED FEB. 18, 1903.
NO MODEL.
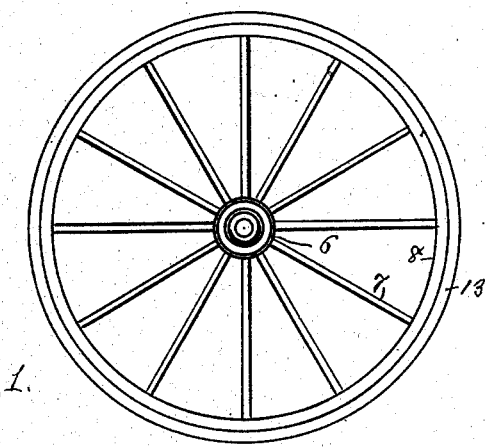
Fig. 1.
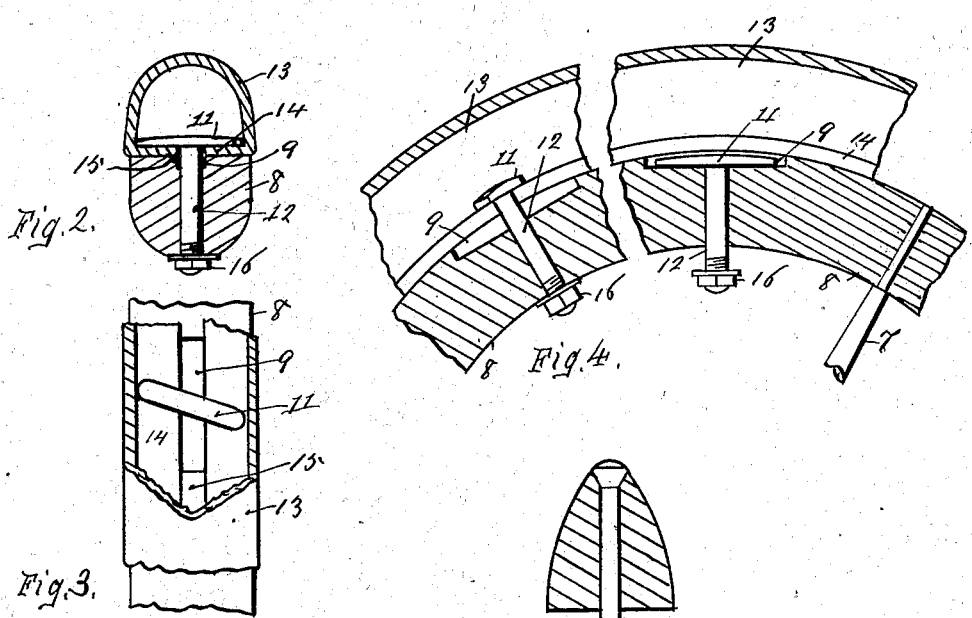
WITNESSES.
Samuel S. Carr.
Helen Munns.
INVENTOR.
Andrew D. Van Ausdall,
By Robert S. Carr. Atty.

No. 729,704. Patented June 2, 1903.

UNITED STATES PATENT OFFICE.

ANDREW D. VAN AUSDALL, OF OXFORD, OHIO.

WHEEL-TIRE.

SPECIFICATION forming part of Letters Patent No. 729,704, dated June 2, 1903.

Application filed February 18, 1903. Serial No. 143,937. (No model.)

*To all whom it may concern:*

Be it known that I, ANDREW D. VAN AUSDALL, a citizen of the United States, residing at Oxford, Butler county, Ohio, have invented a new and useful Improvement in Wheel-Tires, of which the following is a specification.

My invention relates to wheel-tires adapted to use on vehicle-wheels and elsewhere; and the objects of my improvement are to provide a metal tire that has some elasticity, that will not stretch and become loose on the wheel, that will push obstructions laterally from its path instead of jolting over them, and that will prevent the bolts from falling out. These objects are attained in the following-described manner, as illustrated in the accompanying drawings, in which—

Figure 1 is an end elevation of a vehicle-wheel provided with my improvement. Fig. 2 is a cross-section of the tire and rim of the wheel; Fig. 3, a plan of portions of the tire and rim with parts in section; Fig. 4, a longitudinal section of portions of the rim and tire with parts broken away, and Fig. 5 a modified form of construction.

In the drawings, 6 represents the hub, 7 the spokes, and 8 the felly or rim, of a vehicle-wheel. Said rim is formed with longitudinal recesses 9 in its face to conceal the respective T-heads 11 of bolts 12. Tire 13 consists of a thin metal tube formed with a convex, semicylindrical, or preferably V-shaped face, as shown in Figs. 2 and 5, and with a flat inner surface or base 14, which contains an open seam or longitudinal groove 15. After the tire is curved to fit the rim of its intended wheel its ends are secured together by welding or brazing in the usual manner. Before placing the tire on the rim the T-heads of the bolts are seated in recesses 9 to permit the tire to be passed over them. When the tire is placed in proper position on the rim, the bolts are moved outwardly until their T-heads are passed through groove 15 and into the interior of the tire, when they are turned until the extremities of said T-heads form contact against the inner sides of the tire to prevent the further turning of the bolts during the tightening of the nuts 16, which serve to securely clamp and maintain the tire in place on the rim. Should the nuts become lost, the bolts will remain in place and prevent any lateral movement of the tire on the rim, and if the rim should become shrunken and the tire loose thereon the bolts will continue to retain it in proper place. The convex face of the tire will push loose stones and other obstacles on the road-bed to one side instead of jolting over them, like the broad flat tires do that are in common use.

Tubular or hollow tires have the advantage of strength and slight elasticity, combined with lightness of weight. Solid tires of this form in cross-section, as shown in Fig. 5, may be used, if desired, and bolted on their rim in the ordinary manner.

Having fully described my improvement, what I claim as my invention, and desire to secure by Letters Patent of the United States, is—

1. In a wheel, the combination with a rim formed with recesses in its face, and respective T-head tire-bolts, of a tubular metal tire formed with a convex face, and with a flat base which contains a longitudinal groove or seam for the insertion of the bolt-heads therethrough.

2. In a wheel, the combination with a rim, of a tubular metal tire substantially triangular in cross-section and formed with an open seam in its base contiguous to the rim, and T-head clamping-bolts inserted through the seam and the rim for the purpose specified.

ANDREW D. VAN AUSDALL.

Witnesses:
L. D. HOUSE,
R. S. CARR.